United States Patent [19]

Bildner

[11] E Re. 29,659

[45] Reissued June 6, 1978

[54] RADIAL SKI HAVING A PROFILED RUNNING SURFACE

[76] Inventor: Heinz Helmut Bildner, Traunsteiner Strasse 57, 8221 Seebruck, Germany

[21] Appl. No.: 771,836

[22] Filed: Feb. 24, 1977

Related U.S. Patent Documents

Reissue of:

[64] Patent No.: 3,871,671
Issued: Mar. 18, 1975
Appl. No.: 366,615
Filed: Jun. 4, 1973

[30] Foreign Application Priority Data

Jun. 8, 1972 Germany ..... 2227980
Feb. 27, 1973 Germany ..... 2309782

[51] Int. Cl.[2] ..... A63C 5/04
[52] U.S. Cl. ..... 280/608
[58] Field of Search ..... 280/608

[56] References Cited

U.S. PATENT DOCUMENTS 3,063,728 11/1962 Patterson ..... 280/608

FOREIGN PATENT DOCUMENTS

| | | |
|---|---|---|
| 213,292 | 1/1959 | Austria. |
| 1,193,933 | 5/1959 | France. |
| 1,339,600 | 9/1963 | France. |
| 2,077,049 | 9/1971 | France. |
| 2,041,025 | 10/1971 | Germany. |
| 2,042,380 | 3/1972 | Germany. |
| 2,140,703 | 2/1973 | Germany. |
| 188,909 | 1/1937 | Switzerland. |

*Primary Examiner*—Philip Goodman
*Attorney, Agent, or Firm*—Pennie & Edmonds

[57] ABSTRACT

A ski having a sole profile which is symmetric to the longitudinal axis of the ski and defined at both sides by edges of wear-resistant material and comprising a further edge on each side projecting laterally over the corresponding first edge on this side.

10 Claims, 15 Drawing Figures

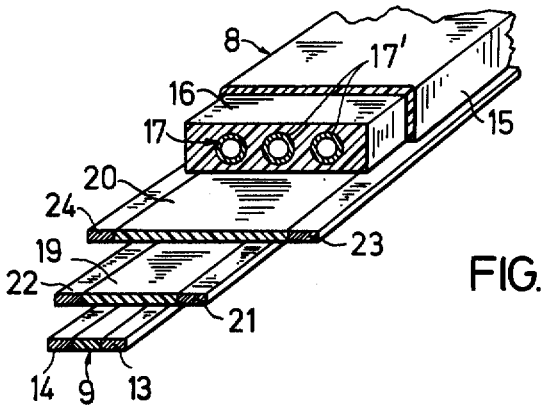
FIG. 6
FIG. 7
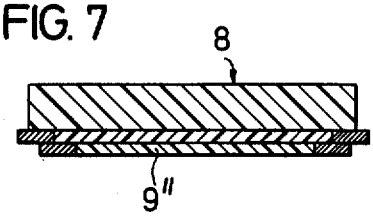
FIG. 8
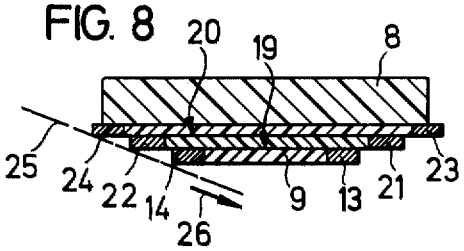
FIG. 9
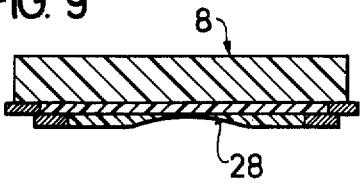
FIG. 10
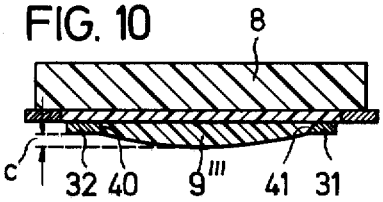

RADIAL SKI HAVING A PROFILED RUNNING SURFACE

Matter enclosed in heavy brackets [ ] appears in the original patent but forms no part of this reissue specification; matter printed in italics indicates the additions made by reissue.

THE BACKGROUND OF THE INVENTION

A ski consists of a body or carrier, a running surface or sole and steel edges at both sides of the running surface. The ski body is made up of layers or sheets of wood, steel and/or plastic, the running surface is formed by a plastic coat, and the steel edges are either bars of rectangular cross section inserted at both sides of the running surface or metal sectional material with a sharp outer edge embedded in the plastic.

The running surfaces or soles of known skis have so-called running grooves to improve the tracking properties of the ski. In most cases a semi-circular fluting is provided which extends in the middle of the sole, in other cases, e.g., with jumping skis a plurality of parallel flutings are provided in the sole. Moreover, it is known to design the running groove as a broad channel with rectangular cross section. Finally, ski edges are known which comprise skids or have an edge profile that tapers outwardly, as seen in cross section, or have a hollow polished or ground section similar to skates. It is the purpose of these measures to improve the ski such that it will better maintain the direction determined by the skier, in other words hold the track better than is possible with smooth running surfaces.

An essential factor in considering the usefulness of a ski is the coordination between the steel edges and the elasticity of the ski. The steel edges make it possible to bring the ski into engagement with the ground during a change of direction, i.e., when swinging or turning so that the skier can dominate the radial drift or sideslip during a swing, in other words keep it as small as possible. The elastic properties of the ski should be chosen such that the steel edge will engage the ground approximately uniformly over its entire length upon a turn. This engagement of the steel edges during swinging or turning is necessary especially on trails or runs, above all on hard runs. With all the known skis only one steel edge will engage the ground in a turn during which the ski is slightly tilted inwardly. Any attempt made so far at improving this engagement was always directed at improving the elasticity of the ski.

THE OBJECT OF THE INVENTION

It is the object of the invention to provide a ski affording improved engagement between the edges and the ground not only by virtue of the elastic properties of the ski but also by the shaping of the sole of the ski. In this respect optimum properties of the ski as regards the easiest possible guidance of the ski at the increased grip are aimed at. This is of essential importance in particular for slalom skis.

DESCRIPTION OF THE INVENTION

The invention meets this object by the provision of a ski having at least one guide strip at both sides which forms another edge, projects laterally beyond the respective edge of the running surface, and has this lateral projection diminish from the middle *region* of the ski towards the tip and tail ends. The projection preferably amounts to zero in the area of the tip and tail ends of the ski, in other words near the ends there is only one effective steel edge at each side of the ski, while there are two or more steel edges at each side in the area of the middle of the ski which enter into engagement during a turn.

These measures make it possible to enlarge the number of edges in the central range of the ski which will enter into engagement with the ground. Furthermore, during a straight run or schuss on a trail or course only the sole will become effective as a bearing or supporting surface so that the shaping of the sole according to the invention makes it possible to decrease the supporting area of the ski and thus the friction during schussing or straight skiing on smooth ground at unaltered strength and bearing characteristics in deep snow. Hereby the speed attainable in comparison with known skis is higher, under otherwise equal conditions. It is essential that the edges of the guide strip be separated from the edges of the base. It was found that such design according to the invention will impart to the ski a resistance against torsion which does not surpass the desired extent. A ski according to the invention may also be furnished with plastic edges instead of steel edges, provided the plastic edges are of the required strength.

As the multiplication of the steel edges makes it possible to bring the ski of the invention into better engagement with the ground during swinging than any known ski, the radial drifting or side slipping of the ski during a swing can also be kept smaller without, however, causing the ski tip and tail ends to "dig", i.e., to establish too strong an engagement with the ground. Any possible greater stress on the strength of the ski may be balanced in accordance with the invention by the provision of hollow spaces extending side by side along the ski throughout the body. These may be formed by pipes or tubes or other forms of hollows which may have condensed or compacted rims, if desired.

Furthermore, it was discovered that a ski according to the invention can be turned more easily if the running surface is shaped so as to be slightly convex outwardly, in other words crowned in the area of the middle of the ski. Preferably this running surface may be arranged for replacement by being slidable between the two steel edges of the lowest guide strip.

In another embodiment of the invention the running surface of the ski has concave shape, as seen in cross section, in the range of the forward third of the length of the ski, i.e., near the shovel. This provides for further improvement of the tracking quality of the radial ski according to the invention.

The invention will be described further, by way of example, with the aid of the accompanying drawings, in which.

Figures 1, 1A:
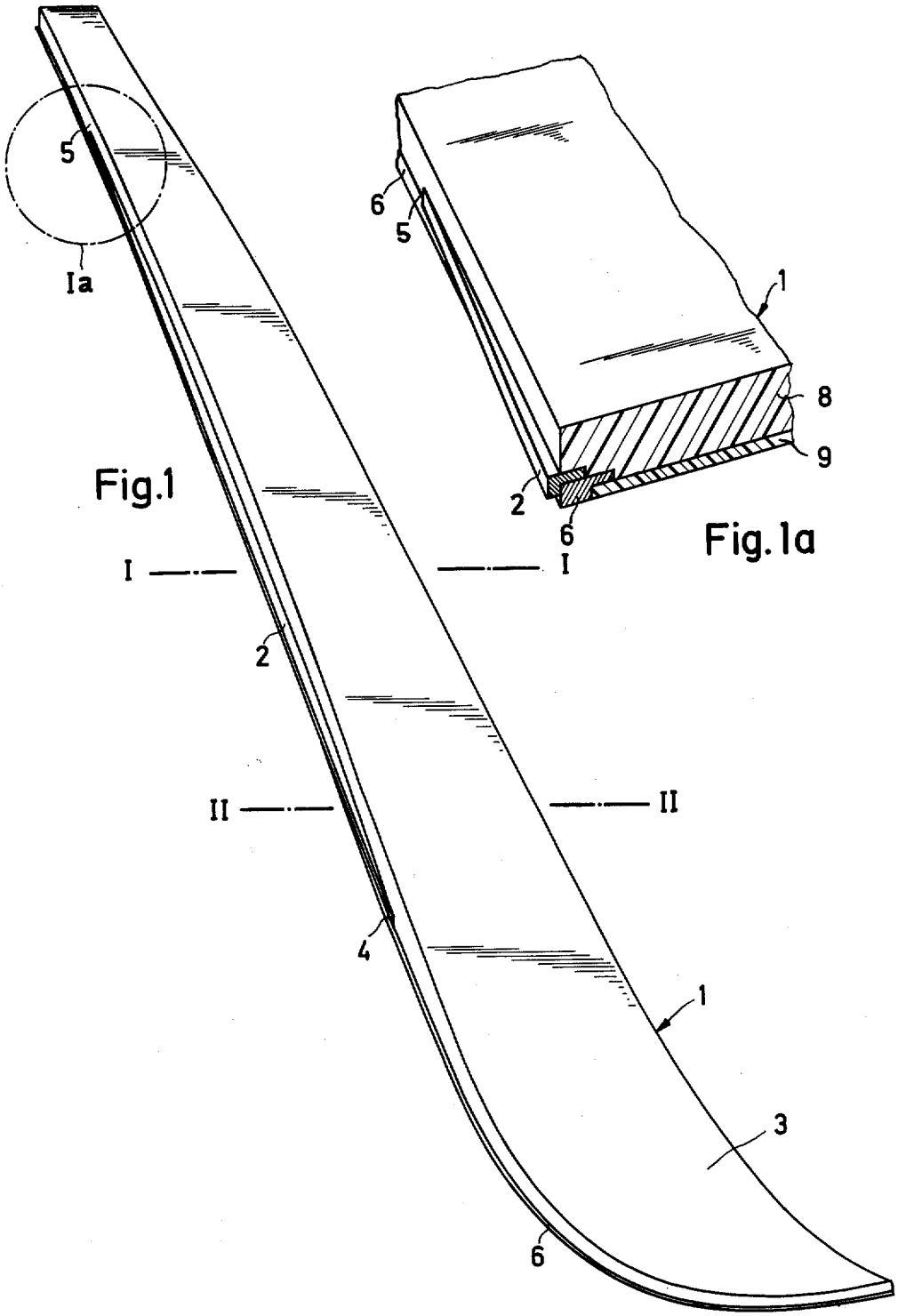
FIG. 1 is a perspective view of a radial ski in accordance with the invention.
FIG. 1a is a perspective view and a section view of the end of the ski.

FIGS. 2a, 2b, 3a, 3b, 4a, 4b, and 5a, 5b are cross sectional and part sectional views, respectively, of skis according to the invention, each figure marked with an a referring to a section taken in the area of line I—I in FIG. 1, and each figure marked with a b referring to a section taken in the area of II—II in FIG. 1, FIG. 6 is an exploded view of a cut through the middle of a ski according to the invention having three edges at each side and showing the laminated structure of the ski, FIGS. 7 to 9 are cross sectional views through the middle of various embodiments of skis according to the invention, FIG. 10 represents an embodiment of the invention having a crowned running surface.

Figure 2A:
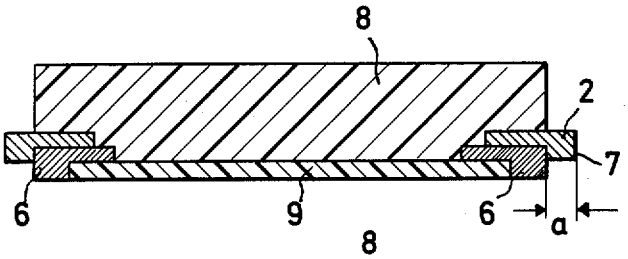
Figure 2B:
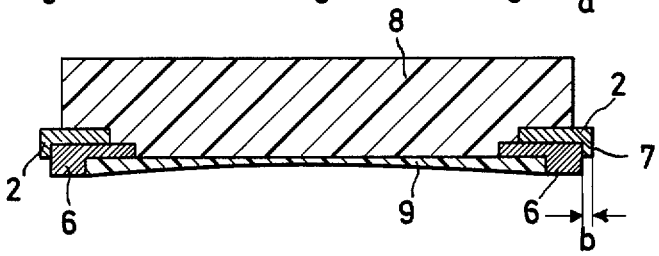
Figure 3A:
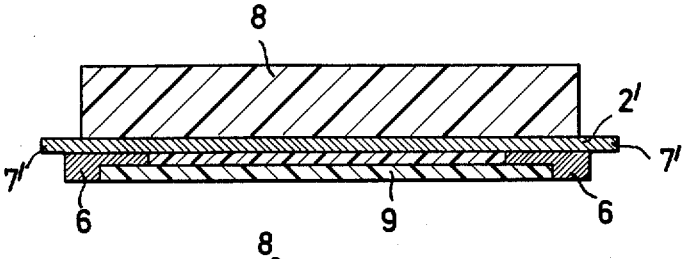
Figure 3B:
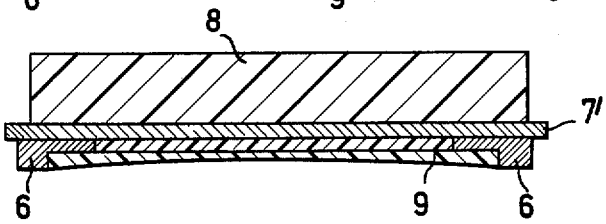
Figure 4A:
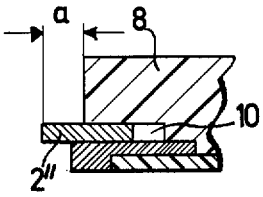

A ski 1 in accordance with the invention is provided in its central portion *or region* with a guide strip 2 having its degree of projection diminish according to the invention towards the shovel 3 and tail 5, as shown in FIG. 1. In FIG. 2a the guide strip 2 is shown in section in the area where its projection is the greatest. The distance by which the guide strip 2 projects in this area is marked a. FIG. 2b shows a section along line II—II, and it is obvious that in this area the degree of projection b is much less already and will become approximately zero at position 4. The same is true of position 5 at the end of the ski.

In the embodiment shown in FIG. 2 the guide strip 2 is superposed at both sides over the steel edge 6, the degree of projection 7 diminishing lengthwise of the ski. Both sectional steel edges 6 and 7 are embedded in the body 8 of the ski. The running surface 9 extends between the steel edges 6,6[.] *and from the tail 5 to the beginning of the shovel 3, and as shown in FIG. 1, the guide strip 2 extends approximately one-half the longitudinal length of the the running surface.* As may be seen from FIG. 2b the running surface has concave shape in the front portion of the ski.

In the embodiment shown in FIG. 3 the guide strip 2' is in the form of a continuous metal layer, its projections 7',7' diminishing towards the tip and tail ends of the ski. With the embodiment according to FIG. 4 the guide strips 2'' are of uniform width throughout and are merely inserted to different extents into the body 8 of the ski. During assembly of the ski resin may be cast into the remaining spaces 10 and 10' in the recesses for the guide strips. An alternative solution provides for fixing this guide strip by screws so that the extent of projection a or b is adjustable.

Figure 5A:
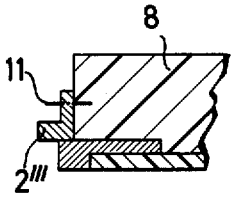
Figure 4B:
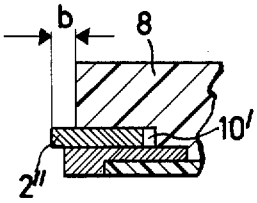
Figure 5B:
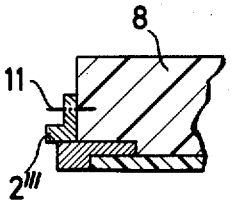

FIGS. 5a and 5b show an embodiment with which the guide strip 2''' may be attached subsequently to the outside of the ski by fastening means 11.

The embodiment of the invention shown in FIG. 6 comprises a body 8 having three edges at each side. Of these three edges the lowest one 13, 14 on each side may be tapering. The running surface 9 is limited by the steel edges 13 and 14. The body 8 is composed of a plastic casing 15 and of a core 16 likewise made of plastic and including hollow sections 17 in accordance with the invention. Such hollow sections may be obtained by the installation of pipes or tubes or by cavities of any desired cross sectional shape having edges or rims 17' which consist of the hardened and/or condensed plastic material of the carrier. In accordance with the invention two projecting guide strips 19 and 20 are provided, each being defined by separate steel edges 21 and 22 and 23 and 24, respectively. FIG. 8 is a diagrammatic sectional view of the structure shown perspectively in FIG. 6. If the ski is tilted during a turn such that its edges 14, 22 and 24 will engage the ground indicated here by the discontinuous line 25, the radial drift (arrow 26) can be kept much smaller, due to the engagement of the three steel edges, than in cases where there is only one steel edge. Moreover, during schussing and on hard runs the ski will move only on the runnning surface 9, which means that the frictional resistance is considerably decreased without affecting the strength of the ski since the body 8 itself corresponds to the full width of the ski.

With the embodiment shown in FIG. 7 the guide strip has nearly the same width as the running surface 9.

The embodiment shown in FIG. 9 comprises a guiding groove 28.

FIG. 10 shows an embodiment of the invention with which an outwardly convex or crowned running surface 9''' is slidably engaged between steel edges 31 and 32 provided with undercuts 41 and 40, respectively. The curvature of the crowned running surface preferably decreases towards the middle of the running surface. The curvature as illustrated in FIG. 10 is exaggerated. In a practical embodiment of the invention the dimension c determined by the degree of curvature of the running surface is between 0.2 and 1 millimeter, preferably between 0.3 and 0.5 millimeters.

In FIGS. 2a and 5b and 7 to 10 the body 8 is merely shown diagrammatically in section. All steel edges are marked by narrower hatching.

I claim:

1. A ski having a profiled running surface which is symmetric to the longitudinal axis of the ski and defined at both sides by edges of wear-resistant material, characterized in that at least one guide strip is provided at each side of the ski forming a further edge projecting laterally over an edge of wear-resistant material, in that each said guide strip extends [in excess of one-half the longitudinal length] *approximately one-half the longitudinal length of the running surface* of the ski, and in that each said guide strip has its lateral projection diminished continuously from [the] *a* middle *region* of the ski towards the tip end and tail end thereof.

2. A ski as claimed in claim 1 further characterized in that each of said guide strips has a vertical extending portion superimposed over a portion of a lateral end of an edge of wear-resistant material.

3. A ski as claimed in claim 1, characterised in that the guide strips are formed by the edges of a metal layer extending throughout the ski.

4. A ski as claimed in claim 1, characterised in that the guide strips are strips of uniform width and thickness throughout their extension and are inserted to different degrees into a groove in the ski.

5. A ski as claimed in claim 1, characterised in that the guide strips are angular strips secured to the side walls of the body of the ski.

6. A ski as claimed in claim 1, characterised in that two superposed guide strips of symmetric design with respect to the center plane of the ski are provided, the guide strip arranged directly above the running surface being narrower than the second guide strip arranged on said first guide strip.

7. A ski as claimed in claim 1, comprising a carrier provided with a casing, characterised in that one or several parallel sectional hollows are included in the carrier.

8. A ski as claimed in claim 1, characterised in that the running surface profile is of outwardly convex shape.

9. A ski as claimed in claim 8, characterised in that the running surface is arranged to be slid between steel edges provided with undercuts.

10. A ski as claimed in claim 1, characterised in that the running surface is of concavely curved cross sectional shape in the area of the shovel and of flat cross sectional shape in the middle of the ski.

* * * * *